US012746169B2

(12) United States Patent
Hu et al.

(10) Patent No.: US 12,746,169 B2
(45) Date of Patent: Sep. 29, 2026

(54) GUIDE RAIL AND FRAME OF MASSAGE CHAIR

(71) Applicant: Shanghai Rongtai Health Technology Corporation Limited, Shanghai (CN)

(72) Inventors: Yuanzha Hu, Shanghai (CN); Yong Qu, Shanghai (CN); Junliang Wang, Shanghai (CN)

(73) Assignee: Shanghai Rongtai Health Technology Corporation Limited, Shanghai (CN)

( * ) Notice: Subject to any disclaimer, the term of this patent is extended or adjusted under 35 U.S.C. 154(b) by 479 days.

(21) Appl. No.: 18/495,963

(22) Filed: Oct. 27, 2023

(65) Prior Publication Data

US 2025/0025362 A1 Jan. 23, 2025

(30) Foreign Application Priority Data

Jul. 17, 2023 (CN) ......................... 202310878372.3

(51) Int. Cl.
*A61H 1/00* (2006.01)
*A61H 7/00* (2006.01)
*A61H 15/00* (2006.01)

(52) U.S. Cl.
CPC ............... *A61H 1/00* (2013.01); *A61H 7/007* (2013.01); *A61H 15/00* (2013.01); *A61H 2201/0149* (2013.01); *A61H 2201/0169* (2013.01); *A61H 2201/1669* (2013.01)

(58) Field of Classification Search
CPC .......... A61H 1/00; A61H 7/004; A61H 7/007; A61H 2201/0149; A61H 2201/1664; A61H 2201/1669; A61H 2201/0138; A61H 2201/0142; A61H 2201/0146; A61H 2201/0192; A61H 2203/0425; B65G 7/04; B65G 13/08; B65G 13/11; B65G 13/12; B65G 41/002
USPC .......................................... 414/285; 104/106
See application file for complete search history.

(56) References Cited

U.S. PATENT DOCUMENTS 2,307,389 A * 1/1943 Carter .................... B65G 13/12 193/35 F
2011/0120837 A1* 5/2011 Theriault ............ B65G 21/209 198/787
2023/0210713 A1* 7/2023 You ...................... A61H 23/006 601/99
(Continued)

FOREIGN PATENT DOCUMENTS

CN 104986540 A * 10/2015 ............. B65G 43/00
CN 116407421 A * 7/2023 ........... A61G 15/007

*Primary Examiner* — Douglas Y Sul

(57) ABSTRACT

A guide rail is mounted on a frame of a massage chair and contains: a support track, a seat track, and a flexible guiding assembly. An end of the flexible guiding assembly is connected with the support track, and the other end of the flexible guiding assembly is connected with the seat track. The flexible guiding assembly includes multiple flexible modules arranged along the extending path of the guide rail. A gap is defined between any two adjacent flexible modules, and any two adjacent flexible modules are rotatably connected by using a rotatable connector. A rotation axial line of the rotatable connector is perpendicular to the extending path of the guide rail, and a width of the gap is adjustable by rotating any two adjacent flexible modules to bend the flexible guiding assembly, hence an angle between the support track and the seat track is changeable.

8 Claims, 9 Drawing Sheets

(56) References Cited

U.S. PATENT DOCUMENTS

2024/0033165 A1* 2/2024 Zhou .................. A61H 15/0078

* cited by examiner

GUIDE RAIL AND FRAME OF MASSAGE CHAIR

TECHNICAL FIELD

The present invention relates to a massage chair, and more particularly to a guide rail and a frame of the massage chair.

BACKGROUND

A frame of a conventional massage chair contains a rigid guide rail defined between a support track and a seat track, so a gap increases when the support track and the seat track are adjustably rotated, and a gear rack is provided with multiple connection sections so that movements of the massage chair pass through the rigid guide rail when the support track and the seat track are at a specific angle. When an opening angle between the support track and the seat track is excessive, the movements vibrates and makes noises when passing through a connection of the guide rail and the support track and a connection of the guide rail and the seat track. Furthermore, the seat and the support back of the massage chair cannot be placed flatly, in other words, an angle between the support back and the seat is 180 degrees, thus limiting using of the massage chair.

The present invention has arisen to mitigate and/or obviate the afore-described disadvantages.

SUMMARY

The primary aspect of the present invention is to provide a guide rail and a frame of a massage chair which is capable of obtaining an angle of 180 degrees between the support track and the seat track to move the multiple movements of the massage chair smoothly.

To obtain above-mentioned aspect, guide rail and a frame of a massage chair e provided by the present invention contains: a support track, a seat track, and a flexible guiding assembly which are arranged along an extending path of the guide rail.

An end of the flexible guiding assembly is connected with the support track, and the other end of the flexible guiding assembly is connected with the seat track.

The flexible guiding assembly includes multiple flexible modules arranged along the extending path of the guide rail.

A gap is defined between any two adjacent flexible modules, and any two adjacent flexible modules are rotatably connected by using a rotatable connector.

A rotation axial line of the rotatable connector is perpendicular to the extending path of the guide rail, and a width of the gap is adjustable by rotating any two adjacent flexible modules to bend the flexible guiding assembly, hence an angle between the support track and the seat track is changeable.

The flexible guiding assembly includes a hinge assembly having multiple stems connected along the extending path of the guide rail, and the hinge assembly has multiple rotary elements, wherein a respective one rotary element is connected with any two adjacent stems, and the respective one rotary element corresponds to a respective one flexible module; the respective one rotary element 108 includes a first rotation part and a second rotation part, wherein the first rotation part is slidably on the respective one flexible module, and a sliding direction of the first rotation part is perpendicular to the extending path of the guide rail.

The respective one flexible module includes a first flexible tracking module and a second flexible tracking module intersected with the first flexible tracking module, wherein two hinge assemblies extend along two sides of the extending path of the guide rail, a first rotation part of one hinge assembly is slidably mounted on the first flexible tracking module, and a first rotation part of the other hinge assembly is slidably fixed on the second flexible tracking module.

Two hinge assemblies are symmetrically provided on the extending path of the guide rail.

A respective one flexible module corresponding to the first rotation part has a slide groove vertically intersected with the extending path of the guiding rail, the slide groove has two slidable blocks located on the two sides of the extending path of the guide rail, and a respective one slidable block is connected with the first rotation part.

The respective one flexible module corresponding to the first rotation part has a first slide groove and a second slide groove which are perpendicular to the extending path of the guiding rail, and a distance is defined between the first slide groove and the second slide groove, wherein a first rotation part of one hinge assembly is connected with the first slide groove via the first slidable block, and a first rotation part of the other hinge assembly is connected with the second slide groove via the second slidable block.

The guide rail further contains a gear rack inserted through the support track, the flexible guiding assembly, and the seat track, wherein a toothed surface of the gear rack is parallel to the rotation axial line of the rotatable connector, and the respective one flexible module has multiple teeth formed thereon.

The respective one flexible module is a U-shaped trench, the rotatable connector is fixed on a middle portion of the U-shaped trench, the gear rack is arranged on a peripheral wall of the U-shaped trench, and a coupling element is fixed on the other peripheral wall of the U-shaped trench, wherein the coupling element is configured to connect with the U-shaped trench.

The guide rail as claimed in claim two flexible modules on two edges of the flexible guiding assembly are rotatably connected with a first rotating element and a second rotating element, the first rotating element is connected with the support track, and the second rotating element is connected with the seat track; wherein an end of a respective one hinge assembly is rotatably connected with the first rotating element via a respective one stem, and the other end of the respective one hinge assembly is rotatably connected with the second rotating element via the respective one stem.

In addition, the frame of the massage chair includes at least one guide rail on which the multiple massage movements are arranged and move along the extending path of the guide rail.

The guide rail of the present invention is fixed on the frame of the massage chair and includes the support track, the seat track, and the flexible guiding assembly which are arranged along the extending path of the guide rail. The flexible guiding assembly is connected with the support track and the seat track so that the support track is flexibly connected with the seat track. The flexible guiding assembly includes the multiple flexible modules arranged along the extending path of the guide rail, and the gap is defined between any two adjacent flexible modules so that any two adjacent flexible modules are rotatably connected by using the rotatable connector, any two adjacent flexible modules rotate within the gap, and the flexible guiding assembly bends, thus changing the angle between the support track and the seat track.

The frame of the massage chair contains the guide rail on which the multiple massage movements are arranged. The angle between the support track and the seat track is 180 degrees to put the frame of the massage chair flatly, thus enhancing a using range. Furthermore, the flexible guiding assembly is connected with the support track and the seat track so that when the multiple massage movements move through the support track and the seat track, they move smoothly without the vibration and the noises, thus enhancing a quality of the frame of the massage chair.

DETAILED DESCRIPTION

Figure 1:
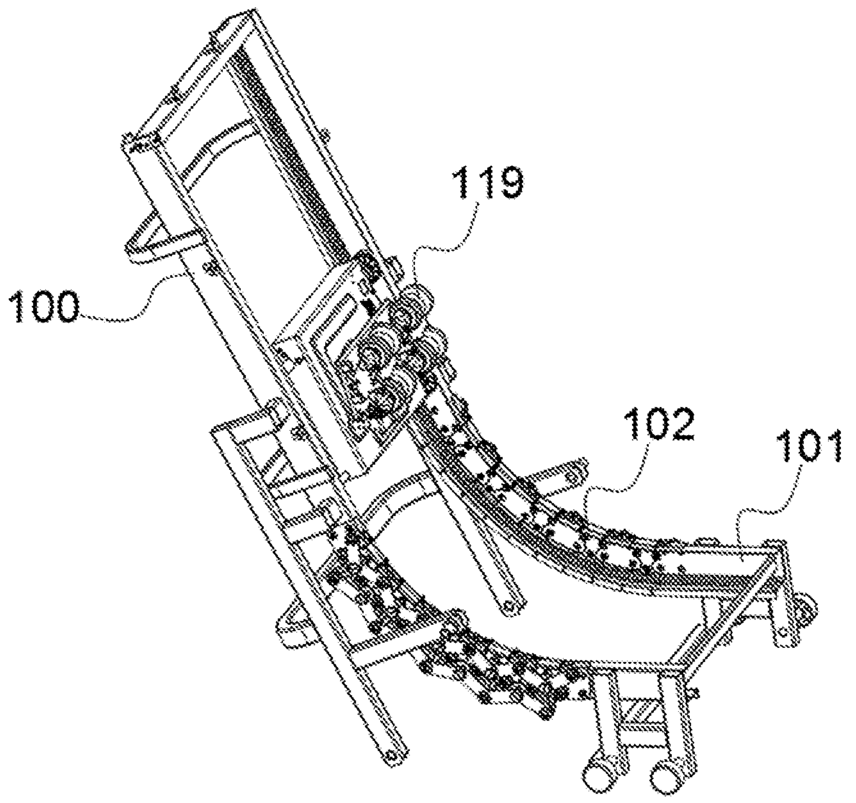
FIG. 1 is a perspective view showing the assembly of a guide rail and a frame of a massage chair according to a preferred embodiment of the present invention.
Figure 2:
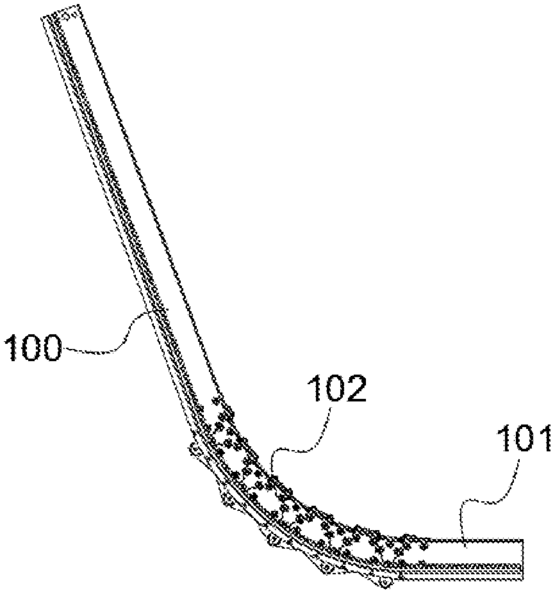
FIG. 2 is a side plan view showing the assembly of the guide rail and the frame of the massage chair according to the preferred embodiment of the present invention.
Figure 3:
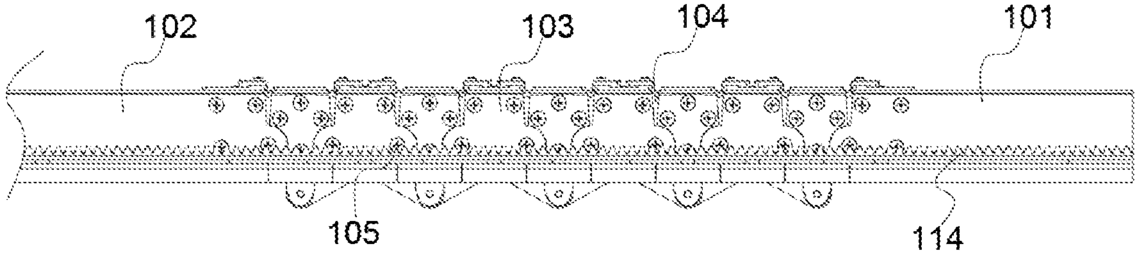
FIG. 3 is a side plan view showing the assembly of a part of the guide rail and the frame of the massage chair according to the preferred embodiment of the present invention.
Figure 4:
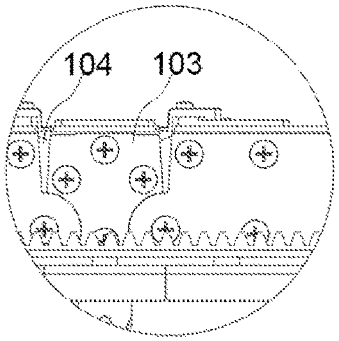
FIG. 4 is another side plan view showing the assembly of a part of the guide rail and the frame of the massage chair according to the preferred embodiment of the present invention.
Figure 5:
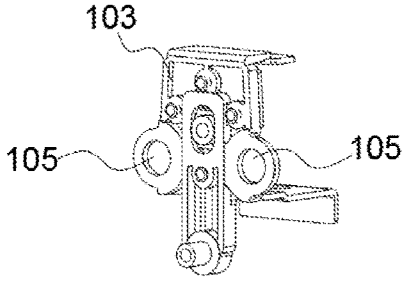
FIG. 5 is a perspective view showing the assembly of a part of the guide rail and the frame of the massage chair according to the preferred embodiment of the present invention.
Figure 6:
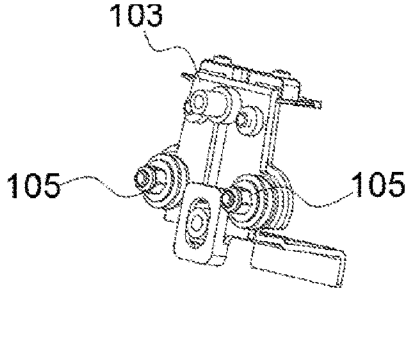
FIG. 6 is another perspective view showing the assembly of a part of the guide rail and the frame of the massage chair according to the preferred embodiment of the present invention.

With reference to FIGS. 1-3, a guide rail fixed on a frame of a massage chair according to a preferred embodiment of the present invention comprises: a support track 100, a seat track 101, and a flexible guiding assembly 102 which are arranged along an extending path of the guide rail. An end of the flexible guiding assembly 102 is connected with the support track 100, and the other end of the flexible guiding assembly 102 is connected with the seat track 101. The flexible guiding assembly 102 includes multiple flexible modules 103 arranged along the extending path of the guide rail. Referring to FIGS. 4-6, a gap 104 is defined between any two adjacent flexible modules 103, and any two adjacent flexible modules 103 are rotatably connected by using a rotatable connector 105. A rotation axial line of the rotatable connector 105 is perpendicular to the extending path of the guide rail, and a width of the gap 104 is adjustable by rotating any two adjacent flexible modules 103 to bend the flexible guiding assembly 102, hence an angle between the support track 100 and the seat track 101 is changeable.

It is to be noted that a rotating angle A between any two adjacent flexible modules 103 is changeable in the gap 104 by rotating the rotatable connector 105, wherein a bending angle of the flexible guiding assembly 102 is a sum of the multiple rotating angles A. Thereby, a respective one rotating angle A between any two adjacent flexible modules 103 is changeable in the gap 104 by rotating a defining element (such as the rotatable connector 105). For example, when the angle between the seat track 101 and the support track 100 is 180 degrees, the gap 104 is located on tops of any two adjacent flexible modules 103, and bottoms of any two adjacent flexible modules 103 abut against each other. After the flexible guiding assembly 102 bends upward to a maximum angle, the gap 104 is located on the bottoms of the any two adjacent flexible modules 103, and the tops of any two adjacent flexible modules 103 abut against each other. In addition, a maximum angle between any two adjacent flexible modules 103 and a number of the multiple flexible modules 103 are determined based on using requirements.

The guide rail of the present invention is fixed on the frame of the massage chair and includes the support track 100, the seat track 101, and the flexible guiding assembly 102 which are arranged along the extending path of the guide rail. The flexible guiding assembly 102 is connected with the support track 100 and the seat track 101 so that the support track 100 is flexibly connected with the seat track 101. The flexible guiding assembly 102 includes the multiple flexible modules 103 arranged along the extending path of the guide rail, and the gap 104 is defined between any two adjacent flexible modules 103 so that any two adjacent flexible modules 103 are rotatably connected by using the rotatable connector 105, any two adjacent flexible modules 103 rotate within the gap 104, and the flexible guiding assembly 102 bends, thus changing the angle between the support track 100 and the seat track 101. Thereby, the flexible guiding assembly 102 is connected with the support track 100 and the seat track 101 so that when multiple massage movements 119 pass through the support track 100 or the seat track 101, the multiple massage movements 119 move smoothly without vibration and noises.

Figure 7:
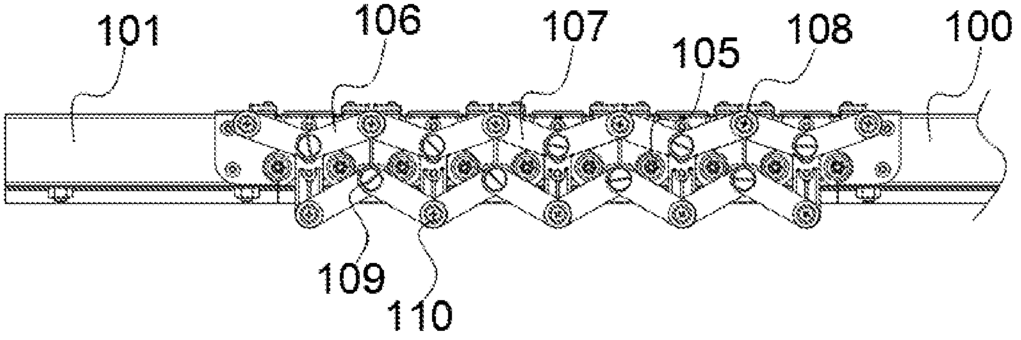
FIG. 7 is another side view showing the assembly of a part of the guide rail and the frame of the massage chair according to the preferred embodiment of the present invention.

As shown in FIG. 7, the flexible guiding assembly 102 includes a hinge assembly 106 having multiple stems 107 connected along the extending path of the guide rail, and the hinge assembly 106 has multiple rotary elements 108, wherein a respective one rotary element 108 is connected with any two adjacent stems 107, and a rotation axial line of the respective one rotary element 108 is parallel to the rotation axial line of the rotatable connector 105, wherein the respective one rotary element 108 corresponds to a respective one flexible module 103. The respective one rotary element 108 includes a first rotation part 109 and a second rotation part 110, wherein the first rotation part 109 is slidably on the respective one flexible module 103, and a sliding direction of the first rotation part 109 is perpendicular to the extending path of the guide rail.

Figure 13:
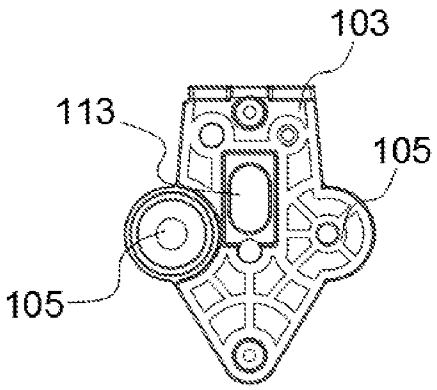
FIG. 13 is a side plan view showing the assembly of the respective one flexible module according to the preferred embodiment of the present invention.
Figure 14:
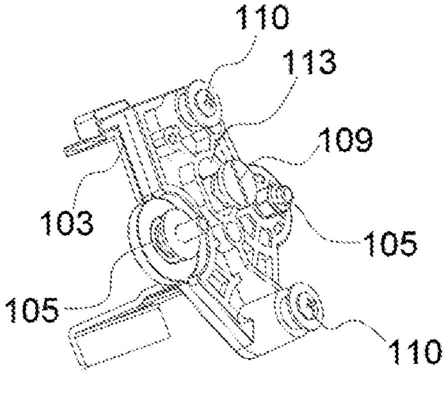
FIG. 14 is a perspective view showing the assembly of the respective one flexible module according to the preferred embodiment of the present invention.

FIG. 13 is a side plan view showing the assembly of the respective one flexible module 103 according to the preferred embodiment of the present invention. FIG. 14 is a perspective view showing the assembly of the respective one flexible module 103 according to the preferred embodiment of the present invention.

Figure 15:
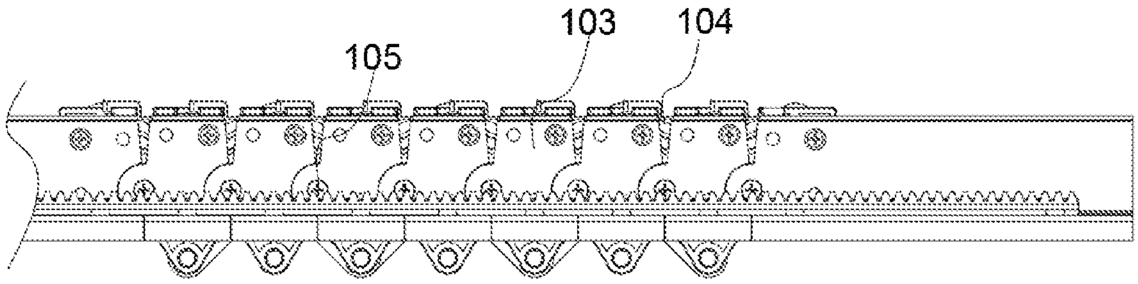
FIG. 15 is a side plan view showing the assembly of the flexible guiding assembly according to the preferred embodiment of the present invention.

FIG. 15 is a side plan view showing the assembly of the flexible guiding assembly 102 according to the preferred embodiment of the present invention.

Figure 16:
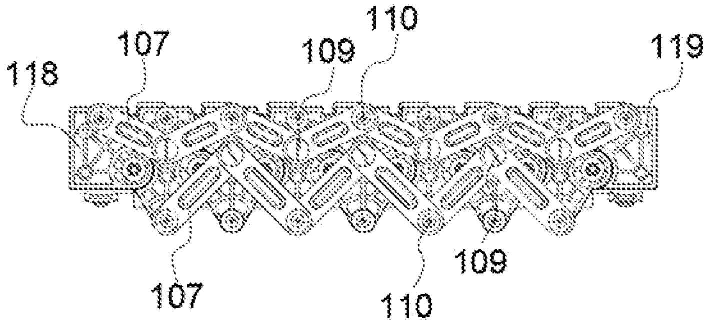
FIG. 16 is a side plan view showing the operation of the flexible guiding assembly according to the preferred embodiment of the present invention.

FIG. 16 is a side plan view showing the operation of the flexible guiding assembly 102 according to the preferred embodiment of the present invention.

Figure 17:
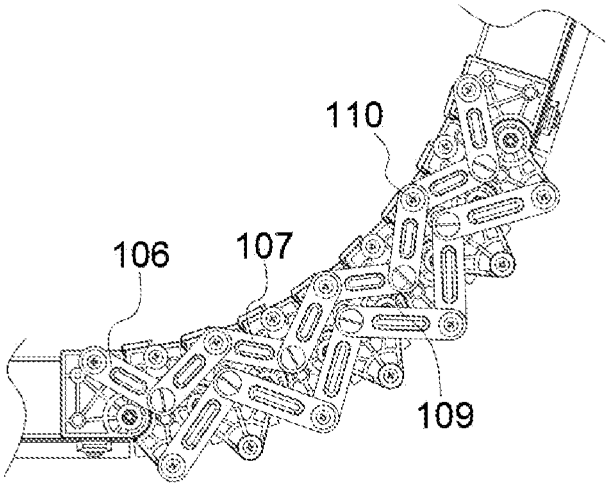
FIG. 17 is another side plan view showing the operation of the flexible guiding assembly according to the preferred embodiment of the present invention.

FIG. 17 is another side plan view showing the operation of the flexible guiding assembly 102 according to the preferred embodiment of the present invention.

As illustrated in FIG. 7, a strength of the flexible guiding assembly 102 is enhanced by providing the hinge assembly 106. An end of a respective one stem 107 slides upward on a direction perpendicular to the extending path of the guide rail. When the flexible guiding assembly 102 bends, rotation angles A between any two adjacent flexible modules 103 of the multiple flexible modules 103 are equal so that the multiple flexible modules 103 rotate evenly.

Figure 8:
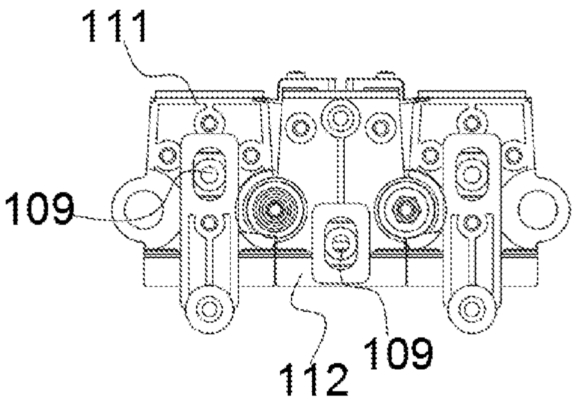
FIG. 8 is also another side view showing the assembly of a part of the guide rail and the frame of the massage chair according to the preferred embodiment of the present invention.

With reference to FIG. 8, in another embodiment, the respective one flexible module 103 includes a first flexible tracking module 111 and a second flexible tracking module 113 intersected with the first flexible tracking module 111, wherein two hinge assemblies 106 extend along two sides of the extending path of the guide rail, a first rotation part 109 of one hinge assembly 106 is slidably mounted on the first flexible tracking module 111, and a first rotation part 109 of the other hinge assembly 106 is slidably fixed on the second flexible tracking module 112.

Thereby, the two hinge assemblies 106 are configured to connect the support track 100 and the seat track 101 stably by mating with the first flexible tracking module 111 and the second flexible tracking module 112, wherein the first rotation part 109 of the one hinge assembly 106 is slidably mounted on the first flexible tracking module 111, and the first rotation part 109 of the other hinge assembly 106 is slidably fixed on the second flexible tracking module 112, such that the first flexible tracking module 111 is intersected with the second flexible tracking module 112 so that the two hinge assemblies 106 slide alternatively to bend the flexible guiding assembly 102 evenly.

Figure 9:
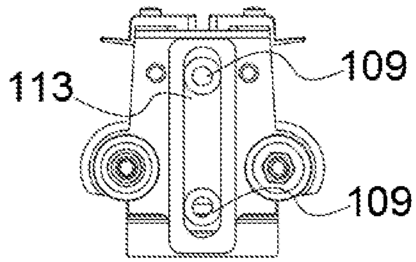
FIG. 9 is still another side view showing the assembly of a part of the guide rail and the frame of the massage chair according to the preferred embodiment of the present invention.

With reference to FIG. 9, in another embodiment, two hinge assemblies 106 are symmetrically provided on the extending path of the guide rail. A respective one flexible module 103 corresponding to the first rotation part 109 has a slide groove 113 vertically intersected with the extending path of the guiding rail, wherein the slide groove 113 has two slidable blocks located on the two sides of the extending path of the guide rail, and a respective one slidable block is connected with the first rotation part 109.

Figure 10:
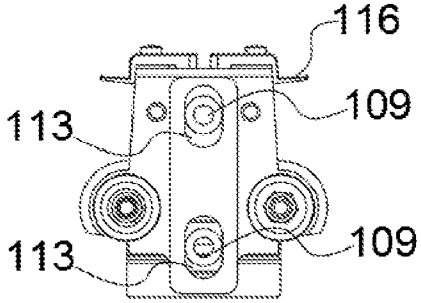
FIG. 10 is also another side view showing the assembly of a part of the guide rail and the frame of the massage chair according to the preferred embodiment of the present invention

With reference to FIGS. 9 and 10, a slide groove 113 is provided to intersect with the extending path of the guide rail or two slide grooves 113 are provided and extend from the two sides of the extending path of the guide rail, such that the multiple stems 107 symmetrical to the extending path of the guide rail are aligned and slide.

The two hinge assemblies 106 are symmetrically provided on the extending path of the guide rail. The respective one flexible module 103 corresponding to the first rotation part 109 has a first slide groove 113 and a second slide groove 113 which are perpendicular to the extending path of the guiding rail, and a distance is defined between the first slide groove 113 and the second slide groove 113, wherein a first rotation part of one hinge assembly 106 is connected with the first slide groove 113 via the first slidable block 113, and a first rotation part of the other hinge assembly 106 is connected with the second slide groove 113 via the second slidable block. Thereby, the two slidable blocks 113 are separately defined on the respective one flexible module 103 along the extending path of the guide rail so that the two hinge assemblies 106 slide alternatively.

Referring to FIG. 3, in another embodiment, the guide rail further comprises a gear rack 114 inserted through the support track 100, the flexible guiding assembly 102, and the seat track 101, wherein a toothed surface of the gear rack 114 is parallel to the rotation axial line of the rotatable connector 105, wherein the respective one flexible module 103 has multiple teeth formed thereon, and the gear rack 114 is arranged on the extending path of the guide rail. The respective one respective one flexible module 103 corresponds to the multiple teeth of the gear rack 114 so that the flexible guiding assembly 102 bends based on the using requirements. Also, and a number of the multiple flexible modules 103 is decreased to reduce a cost of the guide rail and to simplify a structure of the guide rail.

Figure 11:
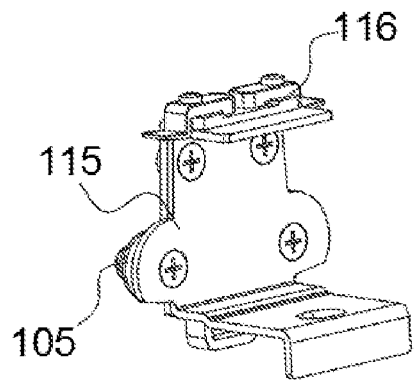
FIG. 11 is still another side view showing the assembly of a part of the guide rail and the frame of the massage chair according to the preferred embodiment of the present invention.
Figure 12:
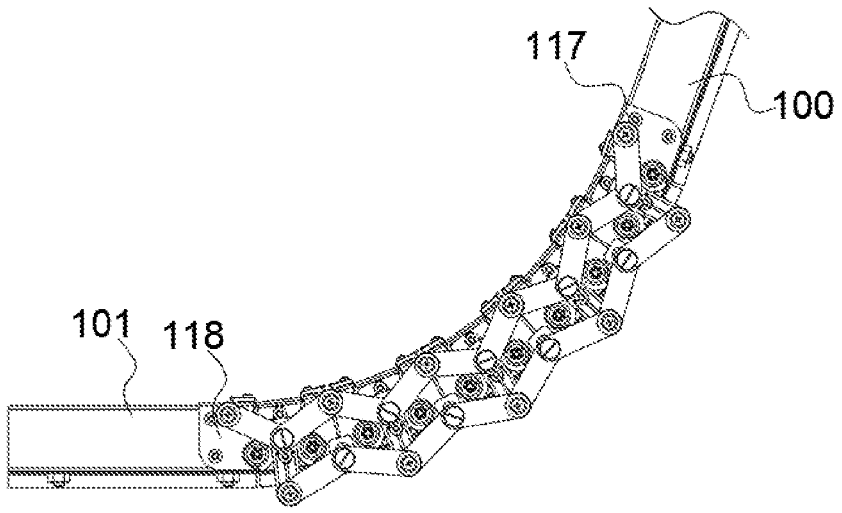
FIG. 12 is another side view showing the assembly of a part of the guide rail and the frame of the massage chair according to the preferred embodiment of the present invention.

As shown in FIG. 11, the respective one flexible module 103 is a U-shaped trench 115, wherein the rotatable connector 105 is fixed on a middle portion of the U-shaped trench 115, the gear rack 114 is arranged on a peripheral wall of the U-shaped trench 115, and a coupling element 116 is fixed on the other peripheral wall of the U-shaped trench 115, wherein the coupling element 116 is configured to connect with the U-shaped trench 115.

The two flexible modules 103 on two edges of the flexible guiding assembly 102 are rotatably connected with a first rotating element 117 and a second rotating element 118, wherein the first rotating element 117 is connected with the support track 100, and the second rotating element 118 is connected with the seat track 101, wherein an end of a respective one hinge assembly 106 is rotatably connected with the first rotating element 117 via a respective one stem 107, and the other end of the respective one hinge assembly 106 is rotatably connected with the second rotating element 118 via the respective one stem 107.

As illustrated in FIG. 1, the frame of the massage chair includes at least one guide rail on which the multiple massage movements 119 are arranged and move along the extending path of the guide rail. In this embodiment, two guide rails are provided and located on two sides of the frame of the massage chair, wherein the multiple massage movements 119 are arranged on the guide rail to move forward and backward on the two guide rails.

Accordingly, the frame of the massage chair comprises the guide rail on which the multiple massage movements 119 are arranged, wherein the angle between the support track 100 and the seat track 101 is 180 degrees to put the frame of the massage chair flatly, thus enhancing a using range. Furthermore, the flexible guiding assembly 102 is connected with the support track 100 and the seat track 101 so that when the multiple massage movements 119 move through the support track 100 and the seat track 101, they move smoothly without the vibration and the noises, thus enhancing a quality of the frame of the massage chair.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A guide rail mounted on a frame of a massage chair and comprising:

a support track, a seat track, and a flexible guiding assembly which are arranged along an extending path of the guide rail;

wherein an end of the flexible guiding assembly is connected with the support track, and a second end of the flexible guiding assembly is connected with the seat track;

wherein the flexible guiding assembly includes multiple flexible modules arranged along the extending path of the guide rail;

wherein a gap is defined between any two adjacent flexible modules, and any two adjacent flexible modules are rotatably connected by using a rotatable connector;

wherein a rotation axial line of the rotatable connector is perpendicular to the extending path of the guide rail, and a width of the gap is adjustable by rotating any two adjacent flexible modules to bend the flexible guiding assembly, hence an angle between the support track and the seat track is changeable wherein the flexible guiding assembly includes a hinge assembly having multiple stems connected along the extending path of the guide rail, and the hinge assembly has multiple rotary elements, wherein a respective one rotary element is connected with any two adjacent stems, and the respective one rotary element corresponds to a respective one flexible module; the respective one rotary element includes a first rotation part and a second rotation part, wherein the first rotation part is slidably on the respective one flexible module, and a sliding direction of the first rotation part is perpendicular to the extending path of the guide rail.

2. The guide rail mounted on a frame of a massage chair as claimed in claim 1, wherein the respective one flexible module includes a first flexible tracking module and a second flexible tracking module intersected with the first flexible tracking module, wherein two hinge assemblies extend along two sides of the extending path of the guide rail, a first rotation part of one hinge assembly is slidably mounted on the first flexible tracking module, and a first rotation part of the other hinge assembly is slidably fixed on the second flexible tracking module.

3. The guide rail mounted on a frame of a massage chair as claimed in claim 1, wherein two hinge assemblies are symmetrically provided on the extending path of the guide rail.

4. The guide rail mounted on a frame of a massage chair as claimed in claim 3, wherein the respective one flexible module corresponding to the first rotation part has a slide groove vertically intersected with the extending path of the guiding rail, the slide groove has two slidable blocks located on the two sides of the extending path of the guide rail, and a respective one slidable block is connected with the first rotation part.

5. The guide rail mounted on a frame of a massage chair as claimed in claim 3, wherein the respective one flexible module corresponding to the first rotation part has a first slide groove and a second slide groove which are perpendicular to the extending path of the guiding rail, and a distance is defined between the first slide groove and the second slide groove, wherein a first rotation part of one hinge assembly is connected with the first slide groove via a first slidable block, and a first rotation part of the other hinge assembly is connected with the second slide groove via a second slidable block.

6. The guide rail mounted on a frame of a massage chair as claimed in claim 1 further comprising a gear rack inserted through the support track, the flexible guiding assembly, and the seat track, wherein a toothed surface of the gear rack is parallel to the rotation axial line of the rotatable connector, and the respective one flexible module has multiple teeth formed thereon.

7. The guide rail mounted on a frame of a massage chair as claimed in claim 6, wherein the respective one flexible module is a U-shaped trench, the rotatable connector is fixed on a middle portion of the U-shaped trench, the gear rack is arranged on a peripheral wall of the U-shaped trench, and a coupling element is fixed on a second peripheral wall of the U-shaped trench, wherein the coupling element is configured to connect with the U-shaped trench.

8. The guide rail mounted on a frame of a massage chair as claimed in claim 1, wherein a first flexible module on a first edge of the flexible guiding assembly is rotatable connected with a first rotating element and a second flexible module on a second edge of the flexible guiding assembly is rotatable connected with a second rotating element, the first rotating element is connected with the support track, and the second rotating element is connected with the seat track; wherein an end of a respective one hinge assembly is rotatably connected with the first rotating element via a first stem, and a second end of the respective one hinge assembly is rotatably connected with the second rotating element via a second stem.

* * * * *